(12) United States Patent
Drzymala et al.

(10) Patent No.: US 8,505,824 B2
(45) Date of Patent: Aug. 13, 2013

(54) BAR CODE READERS HAVING MULTIFOLD MIRRORS

(75) Inventors: Mark Drzymala, Commack, NY (US); Edward D. Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 922 days.

(21) Appl. No.: 12/245,111

(22) Filed: Oct. 3, 2008

(65) Prior Publication Data

US 2009/0026271 A1 Jan. 29, 2009

(51) Int. Cl.
*G06K 9/00* (2006.01)

(52) U.S. Cl.
USPC .................................. 235/462.17; 235/462.14

(58) Field of Classification Search
USPC ............................................ 235/462.01–473
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,059,779 A | 10/1991 | Krichever et al. | |
| 5,124,539 A | 6/1992 | Krichever et al. | |
| 5,200,599 A | 4/1993 | Krichever et al. | |
| 5,304,786 A | 4/1994 | Pavlidis et al. | |
| 5,559,562 A | 9/1996 | Ferster | |
| 5,703,349 A | 12/1997 | Meyerson et al. | |
| 5,705,802 A | 1/1998 | Bobba et al. | |
| 5,717,195 A | 2/1998 | Feng et al. | |
| 5,801,370 A * | 9/1998 | Katoh et al. | 235/462.01 |
| 5,936,218 A | 8/1999 | Ohkawa et al. | |
| 6,006,990 A | 12/1999 | Ye et al. | |
| 6,141,062 A | 10/2000 | Hall et al. | |
| 6,330,973 B1 | 12/2001 | Bridgelall et al. | |
| 6,392,688 B1 | 5/2002 | Barman et al. | |
| 6,538,243 B1 | 3/2003 | Bohn et al. | |
| 6,629,642 B1 | 10/2003 | Swartz et al. | |
| 6,899,272 B2 * | 5/2005 | Krichever et al. | 235/462.37 |
| 6,924,807 B2 | 8/2005 | Ebihara et al. | |
| 6,951,304 B2 | 10/2005 | Good | |

(Continued)

FOREIGN PATENT DOCUMENTS

WO 2009006419 A1 8/2009

OTHER PUBLICATIONS

International Preliminary Report on Patentability dated Jan. 5, 2010 for counterpart application No. PCT/US2008/068810.

(Continued)

*Primary Examiner* — Christle Marshall
(74) *Attorney, Agent, or Firm* — Nong-Qiang Fan (57) ABSTRACT

A multicamera imaging-based bar code reader 10 for imaging a target bar code 30 on a target object 32 features: a housing 20 supporting a plurality of transparent windows H, V and defining an interior region, an imaging system including a plurality of camera assemblies C1-C5 coupled to an image processing system, each camera assembly of the plurality of camera assemblies being positioned within the housing interior. Each camera assembly includes a sensor array. One or more light reflecting fold mirrors M1-M14 define a camera assembly field of view positioned with respect to said light source and the sensor array at locations along a light path to transmit light from light source to the field of view and transmit light that bounces from a target in the field of view back along said light path to the image capture sensor array.

11 Claims, 9 Drawing Sheets

(56) References Cited

U.S. PATENT DOCUMENTS

| | | |
|---|---|---|
| 7,076,097 B2 | 7/2006 | Kondo et al. |
| 7,116,353 B2 | 10/2006 | Hobson et al. |
| 7,191,947 B2 | 3/2007 | Kahn et al. |
| 7,280,124 B2 | 10/2007 | Laufer et al. |
| 7,430,682 B2 | 9/2008 | Carlson et al. |
| 2003/0029915 A1 | 2/2003 | Barkan et al. |
| 2003/0102377 A1 | 6/2003 | Good |
| 2004/0146211 A1 | 7/2004 | Knapp et al. |
| 2004/0189472 A1 | 9/2004 | Acosta et al. |
| 2005/0259746 A1 | 11/2005 | Shinde et al. |
| 2006/0022051 A1* | 2/2006 | Patel et al. ............... 235/462.14 |
| 2006/0118628 A1 | 6/2006 | He et al. |
| 2007/0001013 A1 | 1/2007 | Check et al. |
| 2007/0079029 A1 | 4/2007 | Carlson et al. |

OTHER PUBLICATIONS

U.S. Notice of Allowance dated Jun. 30, 2010 for Counter part U.S. Appl. No. 11/823,818.

US Non Final Office Action dated Jan. 20, 2010 for Counter part U.S. Appl. No. 11/823,818.

US Non Final Office Action dated Sep. 7, 2011 for Counter part U.S. Appl. No. 12/241,153.

US Notice of Allowance dated Sep. 9, 2011 for Counter part U.S. Appl. No. 12/315,235.

Official Report mailed Nov. 2, 2010, in Australia for counterpart application No. 2008272946.

US Notice of Allowance dated Apr. 19, 2010 for U.S. Appl. No. 12/112,275.

International Search Report for International Application No. PCT/US2008/068810 mailed on Feb. 10, 2008.

* cited by examiner

BAR CODE READERS HAVING MULTIFOLD MIRRORS

CROSS REFERENCE TO RELATED APPLICATIONS

U.S. application Ser. No. 11/823,818 filed Jun. 28, 2007 now U.S. Pat. No. 7,780,086 entitled "Imaging Reader with Plural Solid- State Imagers for Electro-Optically Reading Indicia" and U.S. application Ser. No. 12/112,275 filed Apr. 30, 2008 now U.S. Pat. No. 7,757,955 entitled "Bar Code Reader having Multiple Cameras" are applications that are incorporated herein in their entireties.

FIELD OF THE INVENTION

The present invention relates to a imaging-based bar code reader having a mirror arrangement that defines a field of view for such a bar code reader.

BACKGROUND OF THE INVENTION

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to a target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

A stationary imaging-based bar code reader that has a plurality of imaging cameras can be referred to as a multi-camera imaging-based scanner or bar code reader. In a multi-camera imaging reader, each camera system typically is positioned behind one of the plurality of transparent windows such that it has a different field of view from every other camera system. While the fields of view may overlap to some degree, the effective or total field of view of the reader is increased by adding additional camera systems. Hence, the desirability of multicamera readers as compared to single camera readers which have a smaller effective field of view and require presentation of a target bar code to the reader in a very limited orientation to obtain a successful, decodable image, that is, an image of the target bar code that is decodable.

The camera systems of a multi-camera imaging reader may be positioned within the housing and with respect to the transparent windows such that when a target object is presented to the housing for reading the target bar code on the target object, the target object is imaged by the plurality of imaging camera systems, each camera providing a different image of the target object. U.S. patent application Ser. No. 11/862,568 filed Sep. 27, 2007 entitled 'Multiple Camera Imaging Based Bar Code Reader' is assigned to the assignee of the present invention and is incorporated herein by reference. U.S. patent application Ser No. 12/112,275 entitled "Bar Code Reader having multiple Cameras" filed Apr. 30, 2008 is assigned to the assignee of the present invention and is also incorporated herein by reference. U.S. Pat. No. 5,717,195 to Feng et al concerns an "Imaging Based Slot Datform Reader" having a mirror, camera assembly with photosensor array and a illumination system. The disclosure of that patent is incorporated herein by reference.

Figure 6:
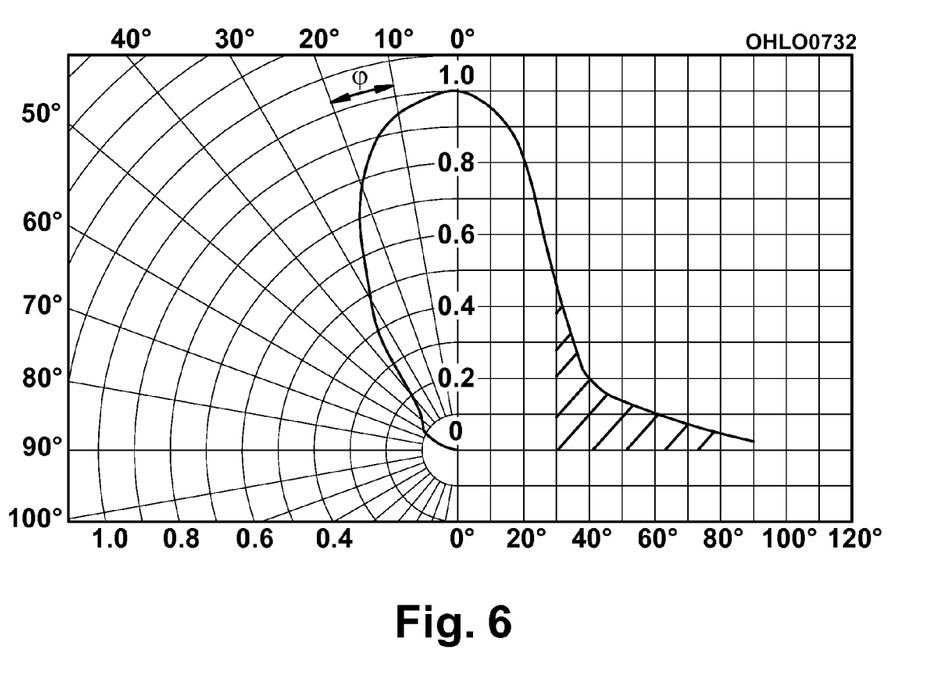
FIG. 6 is a data sheet for a light source showing a fifty percent intensity field of view.

Light emitting diodes (LEDs) have been used to illuminate a bar code reader field of view. An LED concentrates much of its energy within its field of view (FOV). For instance, most LEDs specify a FOV angle where 50% of the light emitted for it is contained. FIG. 6 is an example of a data sheet for a representative light emitting diode wherein fifty percent of the light intensity is contained in a cone of light which subtends an angle of 60 degrees. The remainder of the light may be dispersed in a field of 180 degrees. Lenses are sometimes placed in front of the LEDs in order to capture as much of the light being emitted from them as possible. However, even a lens (or series of lenses) may not capture all of the light into the desired FOV. The light beyond the desired FOV is stray light and may end up in the undesirable places such as in the eyes of a user or customer who happens to be near the bar code reader.

SUMMARY OF THE INVENTION

This disclosure concerns a bar code reader for decoding a target bar code on a target object. One such bar code reader has a housing supporting one or more transparent windows and an imaging system for capturing bar code images.

The disclosed imaging system has an image capture sensor array positioned within the housing interior for capturing an image of a bar code within a field of view. A light source is positioned in close proximity to the image capture sensor. One or more light reflecting fold mirrors define the field of view. The mirrors are positioned with respect to said light source and the sensor array along a light path to transmit light from light source to the field of view and transmit light that bounces from a target in the field of view back to the image capture sensor array. Once the image is captured, an image processing system attempts to identify a bar code from images captured by the imaging system.

The bar code reader provides a long light path length within the housing from the source to an exit window that achieves a number of objects. The camera field of view is designed such that it does not diverge too much as it exits the window. This allows for longer working range since the pixel resolution of the image capture sensor is not greatly changed. The LED field of view is also designed such that it does not diverge too much due to the long internal path length. Since the mirror determines both the imaging and the LED field, the light from the LED is concentrated where it is needed and keeps it out of the customer and user's eyes.

These and other objects, advantages, and features of the exemplary embodiment of the invention are described in detail in conjunction with the accompanying drawings.

DETAILED DESCRIPTION

Figure 5:
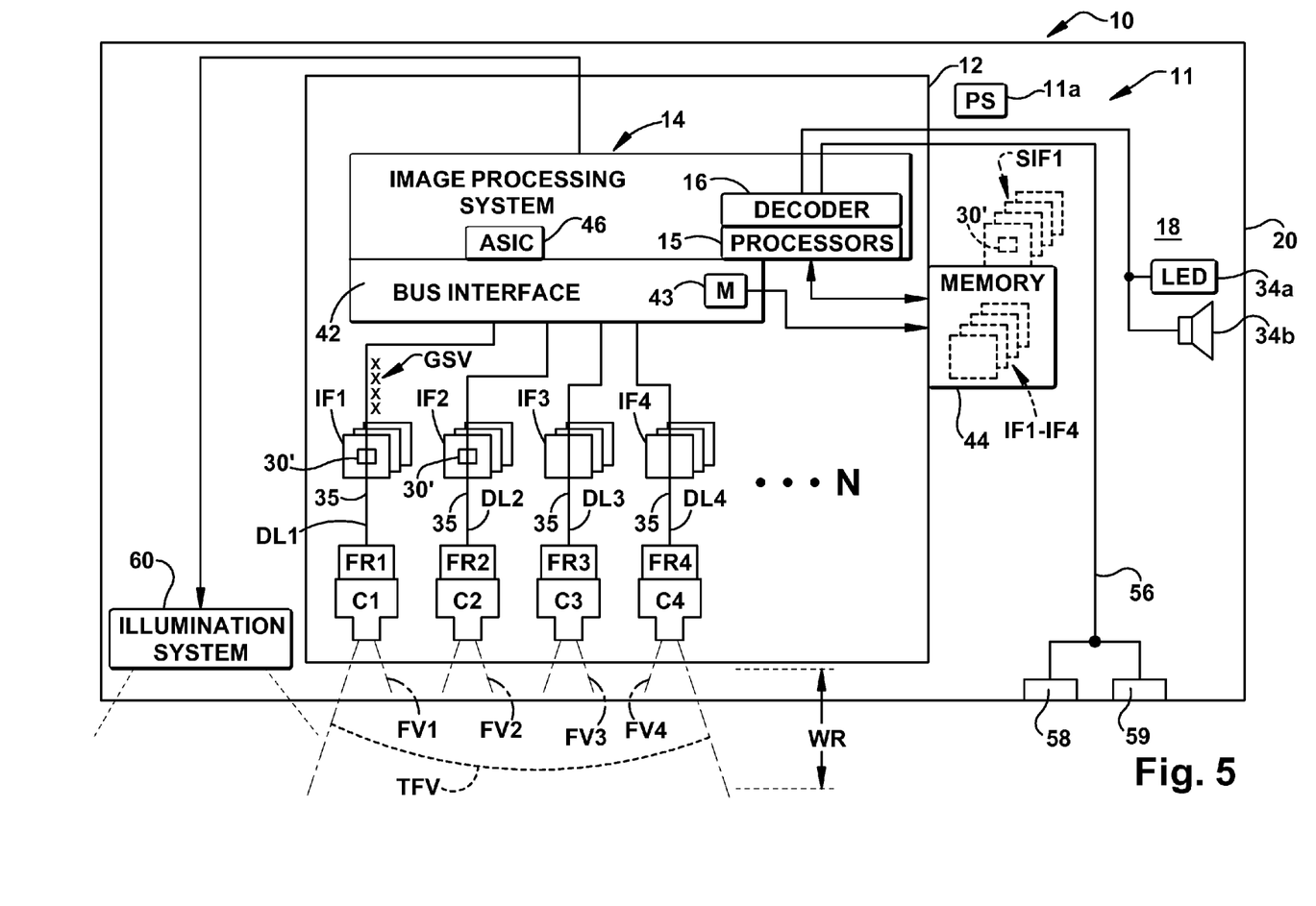
FIG. 5 is a schematic block diagram of selected systems and electrical circuitry of the bar code reader of FIG. 1.

An exemplary embodiment of a multicamera imaging-based bar code scanner or reader 10 of the present invention is shown schematically in the Figures. As depicted in FIG. 5, the bar code reader 10 includes circuitry 11 comprising an imaging system 12 which includes a plurality of imaging cameras C1, C2, C3, C4, . . . which produce raw gray scale images, and an image processing system 14, which includes one or more processors 15 and a decoder 16 that analyzes the gray scale images from the cameras and decodes imaged target bar codes, if present. The imaging system 12 is capable of imaging and decoding both 1D and 2D bar codes and postal codes. The reader 10 is also capable of capturing images and signatures. The decoder 16 may be integrated into the reader 10 or may be a separate system, as would be understood by one of skill in the art. The use of four cameras is described in FIG. 5 but more or less can be incorporated into a reader 10 depending on the reader design and use.

Figure 1:
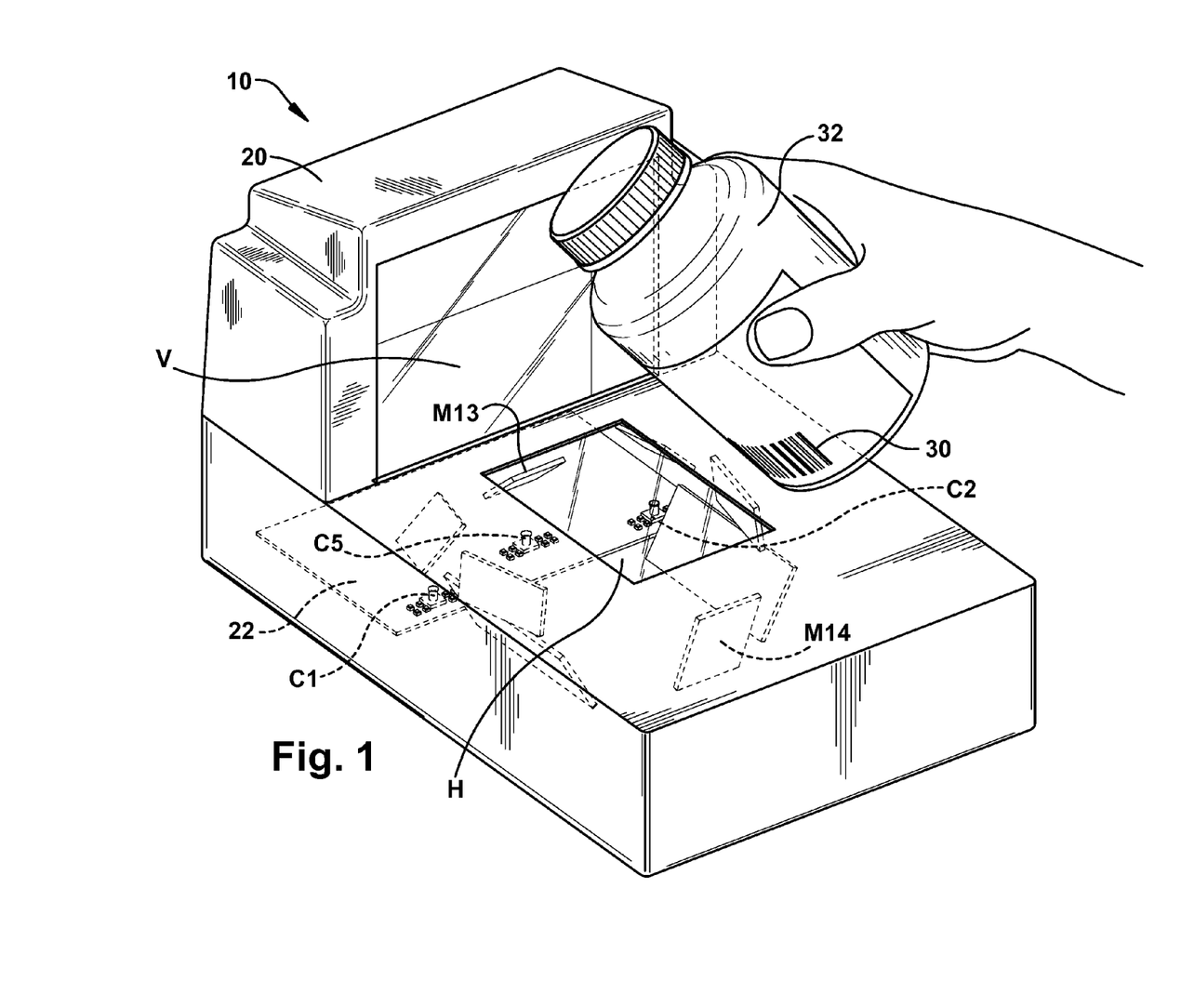
FIG. 1 is a perspective view of a bar code reader having a vertical and a horizontal window through which bar codes are viewed by multiple cameras within the reader.

In one exemplary embodiment, the reader 10 decoder systems are supported within an interior region 18 of a housing 20 (see FIG. 1). The housing 20 may be integrated into a sales counter of a point of sales system that includes, for example, a cash register, a touch screen visual display or other type user interface and a printer for generating sales receipts. The housing 20 depicted in FIG. 1 includes two transparent windows H,V. The reader 10 of FIG. 1 is stationary, the disclosed concepts have applicability to a handheld bar code reader.

In the exemplary embodiment, the multiple camera assemblies C1-CN are mounted to a printed circuit board 22 inside the housing and each camera defines a two dimensional field of view FV1, FV2, FV3, FV4 . . . FVN Positioned behind and adjacent to the windows H,V are reflective mirrors M that help define a given camera field of view such that the respective fields of view FV1-FVN pass from the housing 20 through the windows creating an effective total field of view TFV for the reader 10 in a region of the windows H,V, outside the housing 20. Because each camera C1-CN has an effective working range WR (shown schematically in FIG. 5) over which a target bar code 30 may be successfully imaged and decoded, there is an effective target area in front of the windows H,V within which a target bar code 30 presented for reading may be successfully imaged and decoded.

In accordance with one use, either a sales person or a customer will present a product or target object 32 selected for purchase to the housing 20. More particularly, a target bar code 30 imprinted or affixed to the target object will be presented in a region near the windows H,V for reading, that is, imaging and decoding of the coded indicia of the target bar code. Upon a successful reading of the target bar code, a visual and/or audible signal will be generated by the reader 10 to indicate to the user that the target bar code 30 has been successfully imaged and decoded. The successful read indication may be in the form of illumination of a light emitting diode (LED) 34a (FIG. 5) and/or generation of an audible sound by a speaker 34b upon appropriate signal from the decoder 16.

Each camera assembly C1-CN of the imaging system 12 captures a series of image frames of its respective field of view FV1-FVN. The series of image frames for each camera assembly C1-CN is shown schematically as IF1-IFN in FIG. 5. Each series of image frames IF1-IFN comprises a sequence of individual image frames generated by the respective cameras C1-CN. As seen in the drawings, the designation IF1, for example, represents multiple successive images obtained from the camera C1. The image frames are in the form of respective digital signals representative of raw gray scale values generated by the cameras C1-CN.

The image processor or processors 15 controls operation of the cameras C1-C4. The cameras C1-C4 generate digital signals 35. Each camera includes a charged coupled device (CCD), a complementary metal oxide semiconductor (CMOS), or other imaging pixel array, operating under the control of the imaging processing system 40. In one exemplary embodiment, the sensor array comprises a two dimensional (2D) CMOS array with a typical size of the pixel array being on the order of 752×480 pixels. The signals 35 are raw, digitized gray scale values which correspond to a series of generated image frames for each camera. For example, for the camera C1, the signal 35 corresponds to digitized gray scale values corresponding to a series of image frames IF1. For the camera C2, the signal 35 corresponds to digitized gray scale values corresponding to a series of image frame IF2, and so on. The digital signals 35 are coupled to a bus interface 42, where the signals are multiplexed by a multiplexer 43 and then communicated to a memory 44 in an organized fashion so that the processor knows which image representation belong to a given camera.

The image processors 15 access the image frames IF1-IFN from memory 44 and search for image frames that include an imaged target bar code 30'. If the imaged target bar code 30' is present and decodable in one or more image frames, the decoder 16 attempts to decode the imaged target bar code 30' using one or more of the image frames having the imaged target bar code 30' or a portion thereof. For any individual presentation of a target bar code 30 to the reader windows H, V the orientation and manner of presentation of the target bar code 30 to the windows determines which camera or cameras generate suitable images for decoding.

The reader circuitry 11 includes imaging system 12, the memory 44 and a power supply 11a. The power supply 11a is electrically coupled to and provides power to the circuitry 11 of the reader. The reader includes an illumination system 60 (shown schematically in FIG. 5) which provides illumination (described in greater detail below) to illuminate the effective total field of view TFV that facilitates obtaining an image of a target bar code 30.

For each camera assembly C1-C4, the sensor array is enabled during an exposure period to capture an image of the field of view FV1-FV4 of the camera assembly. The total field of view TFV is a function of both the configuration of the sensor array and the optical characteristics of the imaging lens assembly and the distance and orientation between the array and the lens assembly.

For each camera assembly C1-C4, electrical signals are generated by reading out some or all of the pixels of the pixel array after an exposure period generating the gray scale value digital signal 35. This occurs as follows: within each camera, the light receiving photosensor/pixels of the sensor array are charged during an exposure period. Upon reading out of the pixels of the sensor array, an analog voltage signal is generated whose magnitude corresponds to the charge of each pixel read out. The image signals 35 of each camera assembly C1-C4 represents a sequence of photosensor voltage values, the magnitude of each value representing an intensity of the reflected light received by a photosensor/pixel during an exposure period.

Processing circuitry of the camera assembly, including gain and digitizing circuitry, then digitizes and converts the analog signal into a digital signal whose magnitude corresponds to raw gray scale values of the pixels. The series of gray scale values GSV represent successive image frames generated by the camera assembly. The digitized signal 35 comprises a sequence of digital gray scale values typically ranging from 0-255 (for an eight bit A/D converter, i.e., $2^8=256$), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness). In some sensors, particularly CMOS sensors, all pixels of the pixel array are not exposed at the same time, thus, reading out of some pixels may coincide in time with an exposure period for some other pixels.

As is best seen in FIG. 5, the digital signals 35 are received by the bus interface 42 of the image processing system 40, which may include the multiplexer 43, operating under the control of an ASIC, to serialize the image data contained in the digital signals 35. The digitized gray scale values of the digitized signal 35 are stored in the memory 44. The digital values GSV constitute a digitized gray scale version of the series of image frames IF1-IF4, which for each camera assembly C1-C4 and for each image frame is representative of the image projected by the imaging lens assembly onto the pixel array during an exposure period. If the field of view of the imaging lens assembly includes the target bar code 30, then a digital gray scale value image 30' of the target bar code 30 would be present in the digitized image frame.

The decoding circuitry 14 then operates on selected image frames and attempts to decode any decodable image within the image frames, e.g., the imaged target bar code 30'. If the decoding is successful, decoded data 56, representative of the data/information coded in the target bar code 30 is then output via a data output port 58 and/or displayed to a user of the reader 10 via a display 59. Upon achieving a good read of the target bar code 30, that is, the bar code 30 was successfully imaged and decoded, the speaker 34b and/or an indicator LED 34a is activated by the bar code reader circuitry 11 to indicate to the user that the target bar code 30 has successfully read.

Illumination System 60

In the exemplary system disclosed in the drawings, the illumination system 60 includes multiple light emitting diodes positioned in close proximity to an associated camera assemblies C1-CN. In one embodiment there is one light emitting diode per camera light gathering array and the light emitting diode is mounted next to the light gathering array on a printed circuit board. A distance between the center of the light emitting diode and the center of the camera gathering array is approximately 1 to 1.5 cm.

Figure 2:
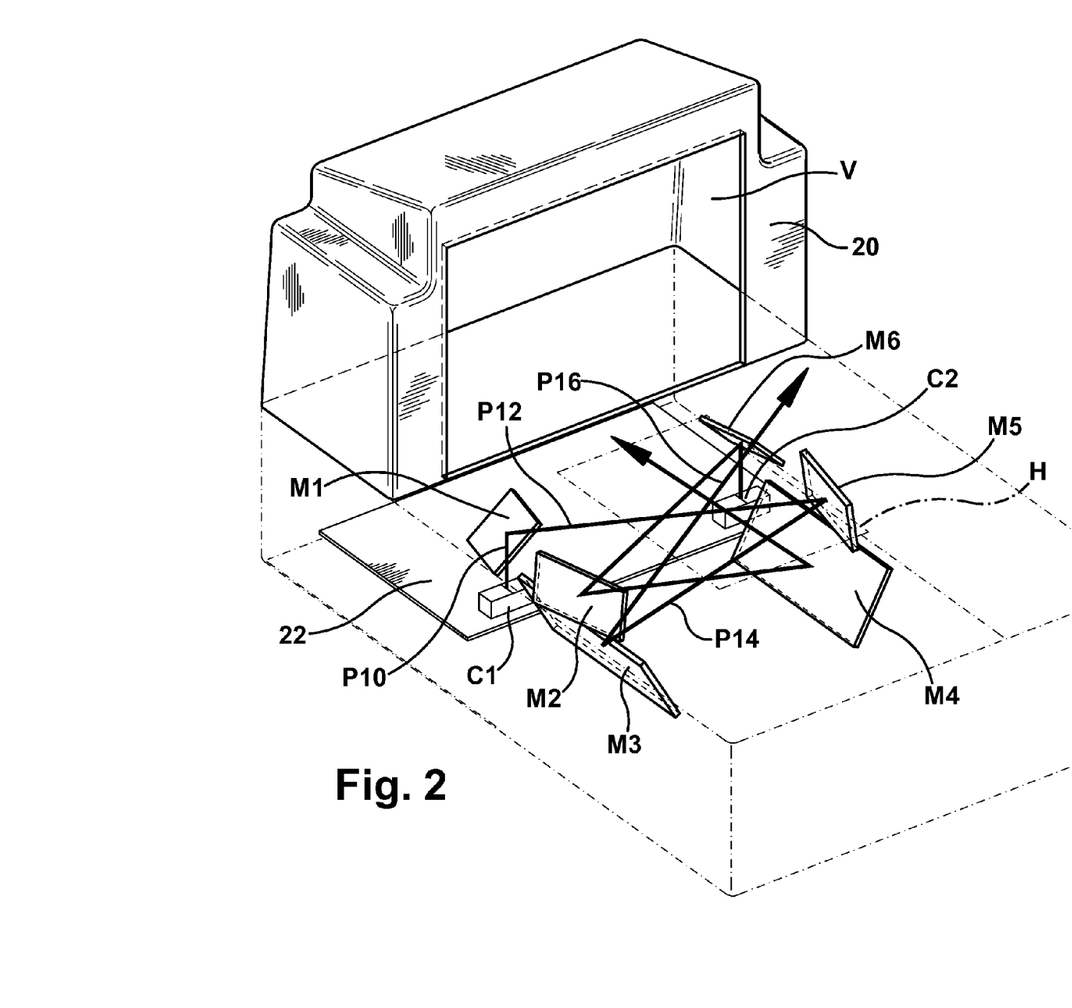
FIG. 2 is a perspective view of the reader of FIG. 1 with a portion of the reader housing removed to illustrate three cameras.
Figures 3, 4:
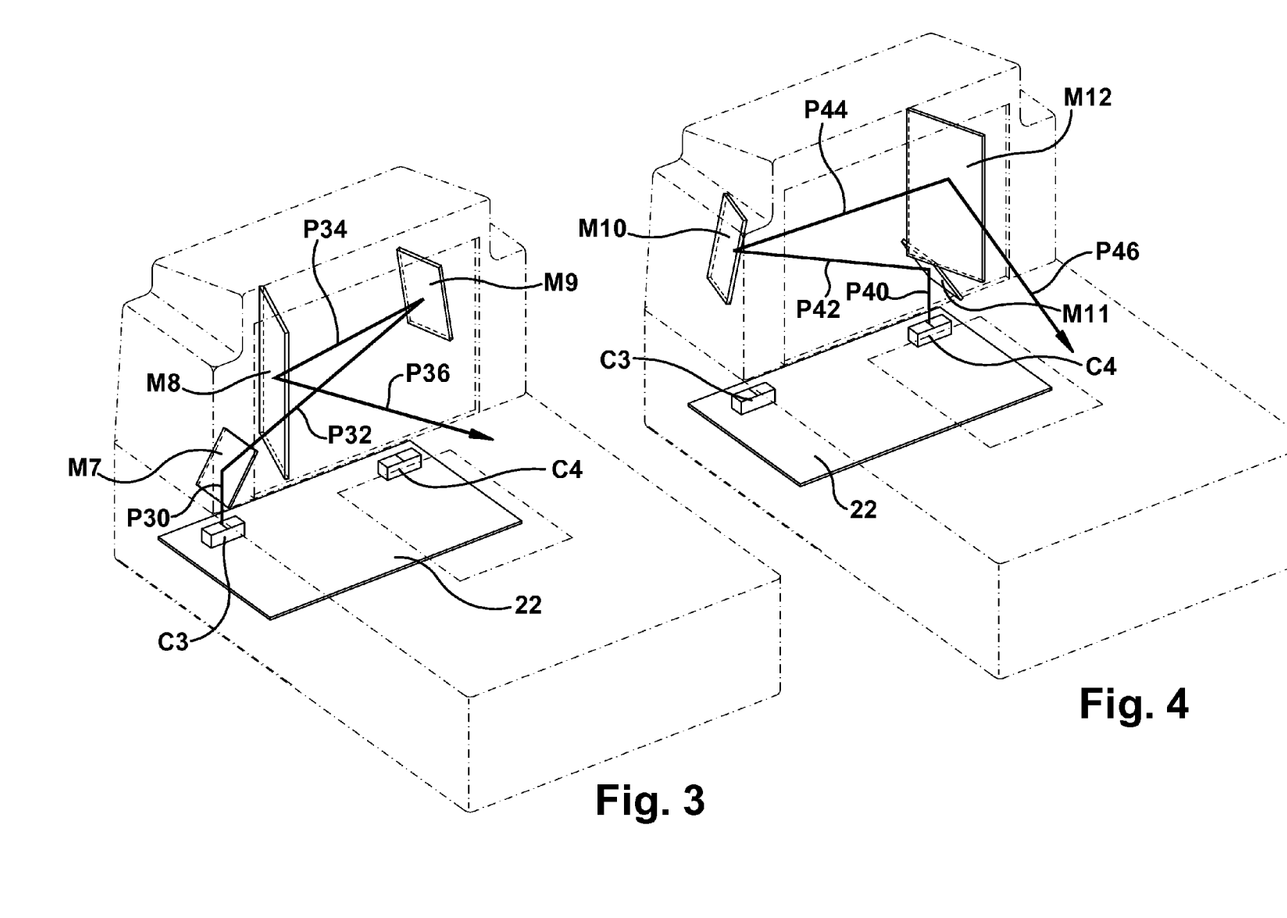
FIGS. 3 and 4 are perspective views showing a position of three additional cameras on a printed circuit board resulting in a total of six cameras.

FIGS. 2-4 show a reader 10 that includes multiple fold mirrors M1-M12 that define the size of an imaging and an illumination field of view for each of the cameras. The size and positioning of each of these mirrors is chosen so that the resulting optical path to the object limits or clips stray light causing it to fall off the edge of the mirror and therefore not exit through the scanner windows H, V.

Features and functions of the fold mirrors M1-M12 shown in the figures are clarified by means of multiple two dimensional schematic representations shown in FIGS. 7-13. When a mirror is used in an optical layout to reflect the reader field of view to another direction, the mirror may be thought of as an aperture (an aperture is a defined as a hole or an opening through which light is admitted). The depictions in FIGS. 7-13 show optical layouts which represent one or more fold mirrors that achieve long path lengths within the reader housing. When the mirror clips or defines the imaging or camera field of view it is referred to as vignetting. When the mirror clips extraneous or unneeded light from a source such as a light emitting diode, it is commonly referred to as baffling.

Figure 7:
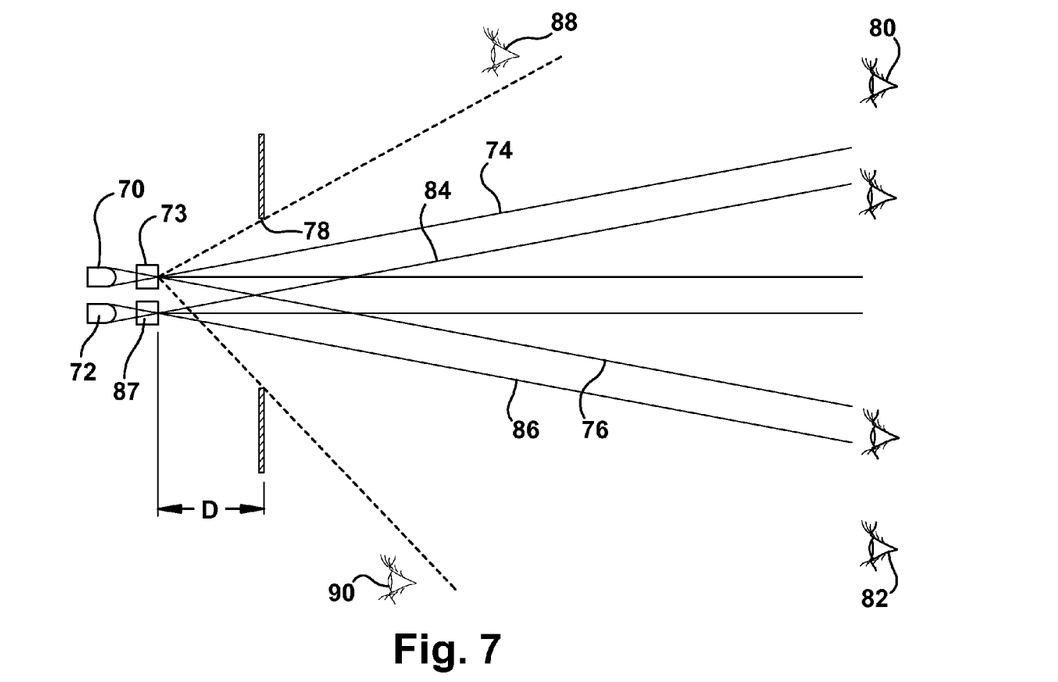
FIGS. 7-13 are schematic depictions showing light paths from a source to a field of view having different fold mirror configurations.

FIG. 7 depicts a single light source 70 such as a light emitting diode positioned next to an image capture array 72 such as a two dimensional charge coupled device commercially available from a number of sources that forms part of a camera assembly. Light from the source 70 passes through a lens 73 bounces off from a large mirror placed in close proximity to the source 70. If the observer positions 80, 82 are just outside the housing and the total light path length to the reader exit window is 20 inches, then close in this instance means a distance D of about 2 inches. The mirror is generally rectangular but angled so that light bounces off the mirror and travels to a region outside the reader housing for illuminating an object and more particularly an object having a bar code affixed thereto. Although the dimension D is representative, this value as well as the others listed for other figures can vary over a working range.

Two rays lines 74, 76 pass through an aperture 78 that depicts the function of the mirror spaced a distance D from the source. These ray lines 74, 76 define the bounds of the light source's 50% intensity region. Two observer positions 80, 82 will see the extransous light source even though they are outside a reasonable reader field of view (FOV) of the camera 72 that is bounded by the light rays 84, 86. Light bouncing off the object returns to the camera 72 within a field of view, passes through a camera lens 87 and is interpreted by the reader 10. Use of a large mirror closely spaced from the source does shield light from the source from reaching two widely spaced apart observer positions 88, 90.

Figure 8:
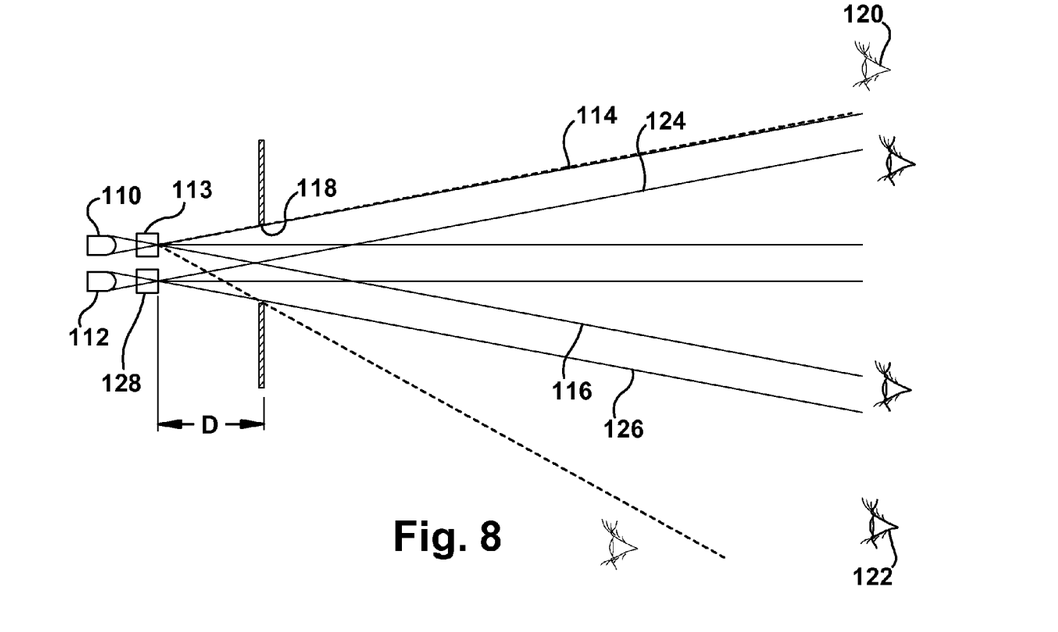

FIG. 8 depicts a single light source 110 such as a light emitting diode positioned next to an image capture array 112. Light from the source passes through a lens 113 bounces off from a smaller mirror (note smaller aperture 118) placed in close proximity to the source 110. Close in this instance means the same distance D of 2 inches. The mirror for the FIG. 8 example is also generally rectangular but angled so that light bounces off the mirror and travels to a region outside the reader housing for illuminating an object.

Two rays lines 114, 116 emitted by the source 110 pass through the smaller aperture 118 that depicts the clipping function of the smaller mirror spaced a distance D from the source. These ray lines 114, 116 define the bounds of the light source 50% intensity. One observer position 120, corresponding to the position 80 in FIG. 7 will not see the light source but due to parallax a second observer position 122 sees the extraneous light. A field of view of the camera 112 is bounded by the light rays 124, 126. Light bouncing off the object passes through a camera lens 128 and is interpreted by the reader. Note how use of a single smaller mirror baffles light and limits the illuminated field of view to the light source's 50% intensity region.

Figure 9:
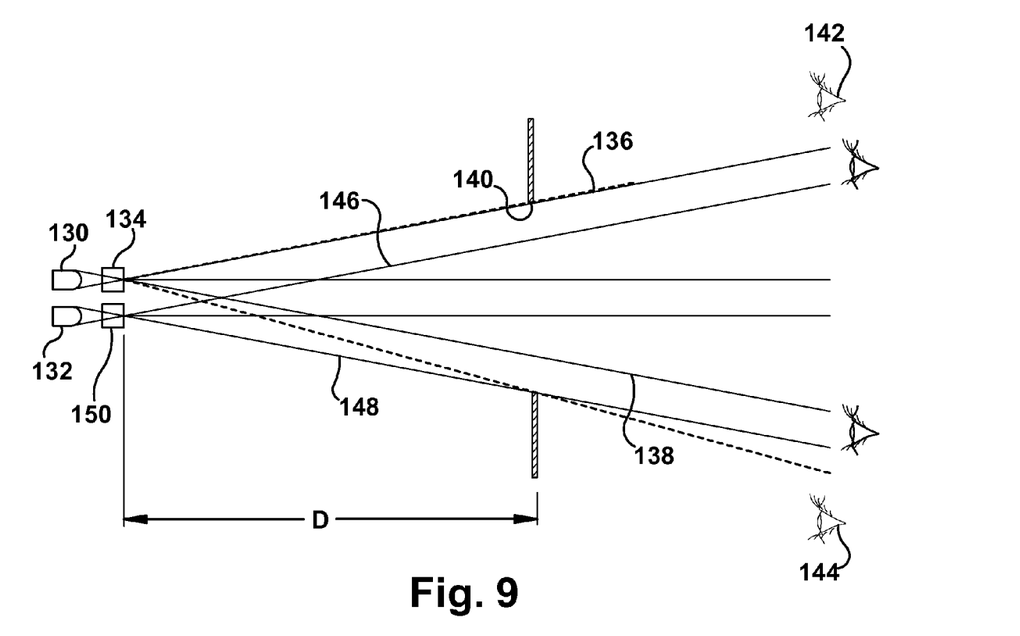

FIG. 9 depicts a single light source 130 such as a light emitting diode positioned next to an image capture array 132. Light from the source passes through a lens 134 bounces off from a mirror spaced a distance D that is greater than the source/mirror separation shown in FIGS. 7 and 8. The spacing D between the lens and the mirror is approximately 9 inches. The mirror is generally rectangular and of approximately the same size as the mirror of FIG. 7. It is angled so that light bounces off the mirror and travels to a region outside the reader housing for illuminating an object and more particularly an object having a bar code affixed thereto.

Two rays lines 136, 138 emitted by the source 130 pass through an aperture 140 that depicts the function of the mirror spaced a greater distance from the source. These ray lines 136, 138 define the bounds of the light source 50% intensity. Observers at two positions 142, 144 corresponding approximately to the positions 80, 82 in FIG. 7 will not see light from the source. A reader field of view of the camera 132 is bounded by the light rays 146, 148. Light bouncing off the object from a camera field of view, passes through a camera lens 150 captured by the camera 132 and is interpreted by the reader. Much less light goes to undesired areas outside a desired camera FOV.

Figure 10:
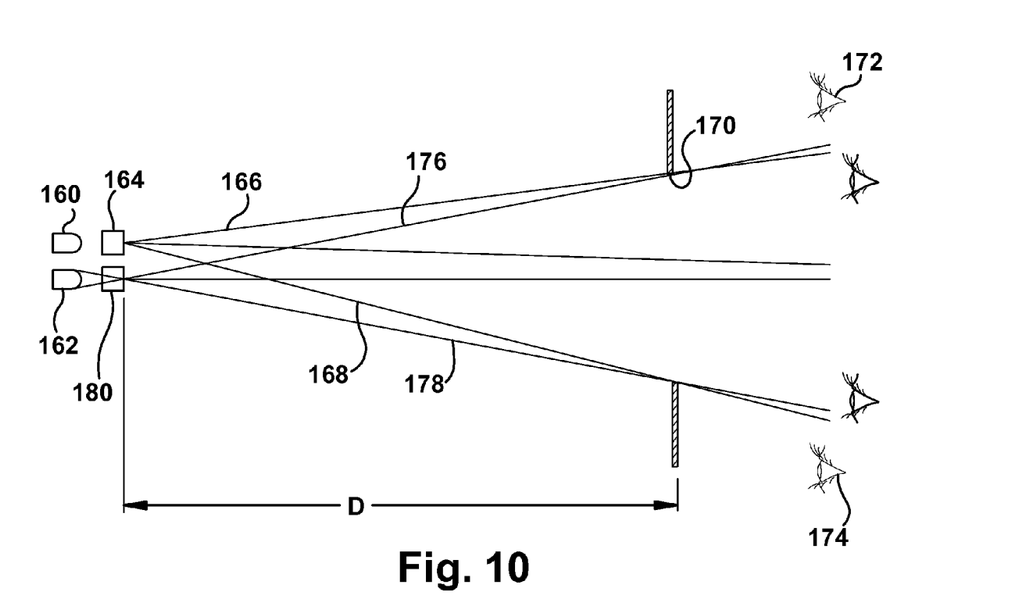

FIG. 10 depicts a single light source 160 such as a light emitting diode positioned next to an image capture array 162. Light from the source passes through a lens 164 bounces off from a mirror spaced further from the source 160 than the mirror shown in FIG. 9. The spacing between the lens and the mirror D is approximately 16 inches. The mirror is generally rectangular but angled so that light bounces off the mirror and travels to a region outside the reader housing for illuminating an object.

Two rays lines 166, 168 emitted by the source 160 pass through an aperture 170 that depicts the function of the larger mirror spaced a greater distance from the source. These ray lines 166, 168 define the bounds of the light source LED desired field of view. Two observer positions 172, 174 will not see the light source.

A field of view of the camera 162 is bounded by the light rays 176, 178. Light bouncing off the object from a camera field of view, passes through a camera lens 180 and is interpreted by the reader. Almost no light goes to undesired areas outside of a desired camera FOV. The desirable result is achieved however, at the expense of a rather long light path which can be improved by using more mirrors while maintaining the length of the light path.

Figure 11:
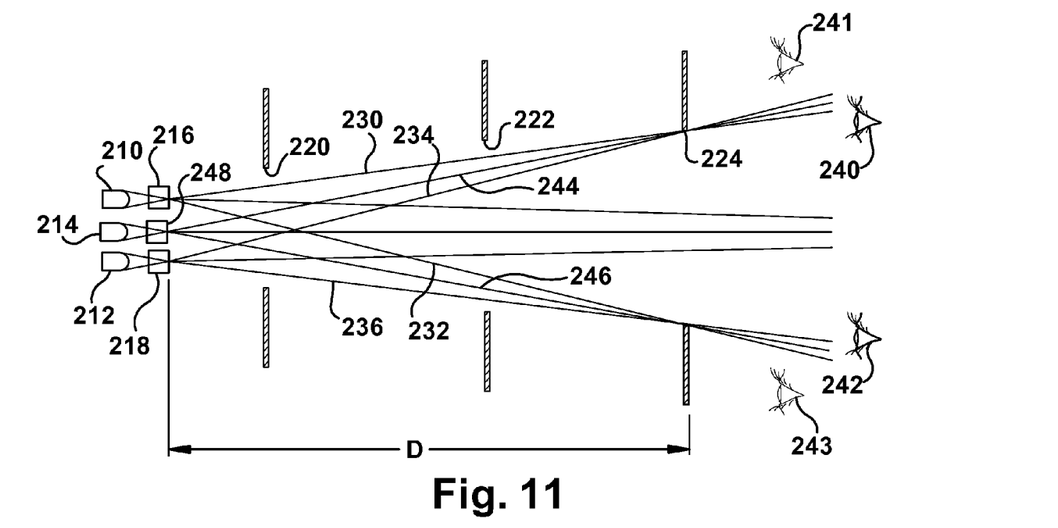

FIG. 11 depicts two side by side light sources 210, 212 such as light emitting diodes positioned next to an image capture array or camera 214 such as a two dimensional charge coupled device. Light from the sources 210, 212 passes through lenses 216, 218 and bounces off from three mirrors represented as three apertures 220, 222, 224 to produce an optical path length D to the last mirror from the sources. In this instance the distance D is about 16 inches. The mirrors are generally rectangular but angled so that light bounces off the mirror and travels to a region outside the reader housing for illuminating an object. Mirror geometries using three fold mirrors are depicted in FIGS. 2-4.

Two ray lines 230, 232 from the source 210 pass through a last aperture 224 that depicts the function of the last mirror spaced the greatest distance from the source. These ray lines 230, 232 define the bounds of the desired LED field of view. Two additional ray lines 234, 236 bound a desired LED field of view of the source 212. Two positions 240, 242 are within the desired field of view and extraneous light is shielded from the positions 241, 243. Light bouncing off the object returns to the camera 214 within a camera field of view bound by the rays 244, 246, passes through a camera lens 248 and is interpreted by the reader.

The first and second mirrors in the light path between the source and the object transmit extraneous, unused light which reaches the last of the three mirrors. This geometry allows the path length to be long while allowing the imaging optics to be supported in a relatively compact housing. The last mirror allows almost no extraneous light to exit the housing.

Figure 12:
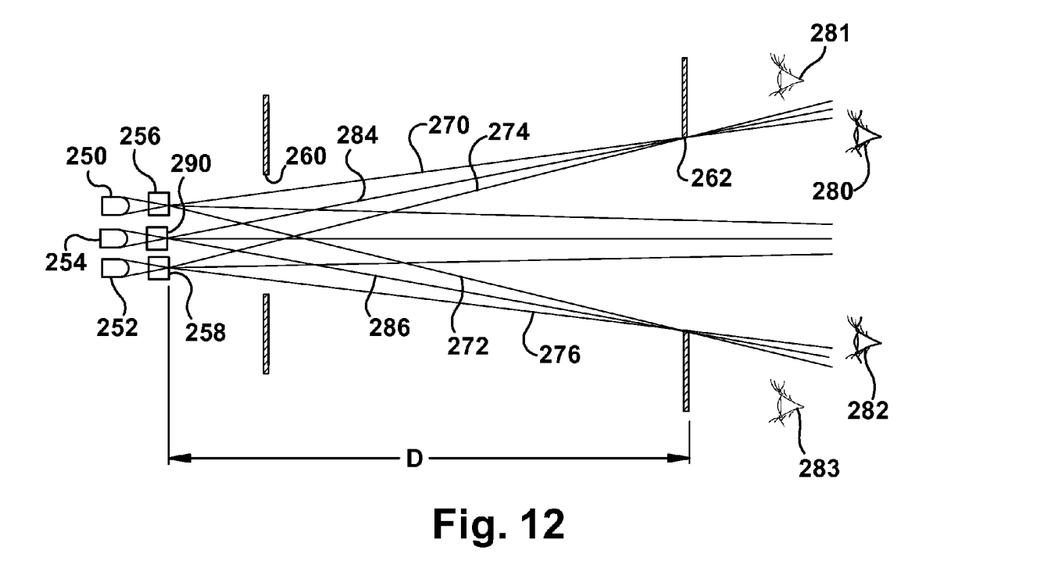

Certain camera geometries only require two or even a single mirror. The camera assemblies C1, C2, C3, C4 shown in FIGS. 2-4 use three mirrors in their illumination/imaging optical paths. A camera assembly C5 (FIG. 1) images through the horizontal window with only two mirrors M13, M14. FIG. 12 depicts two side by side light sources 250, 252 such as light emitting diodes positioned next to an image capture array or camera 254 such as a two dimensional charge coupled device. Light from the sources 250, 252 passes through lenses 256, 258 and bounces off from two mirrors represented by apertures 260, 262 to produce an optical path length D from the last mirror to the sources. In this instance a distance D of 9 inches. The mirrors are generally rectangular but angled so that light bounces off the mirror and travels to a region outside the reader housing for illuminating an object.

Two rays lines 270, 272 pass through the second aperture 262 that depicts the function of the last mirror spaced the greatest distance from the source. These ray lines 270, 272 define the desired field of view of the source 250. Two other rays 274, 276 define the desired field of view of the light source 252. Two positions 280, 282 are within the desired field of view. Light bouncing off the object returns to the camera 254 within a field of view bound by the rays 284, 286, passes through a camera lens 290 and is interpreted by the reader. Almost no light goes to undesired positions 281, 283 outside a desired camera field of view.

Figure 13:
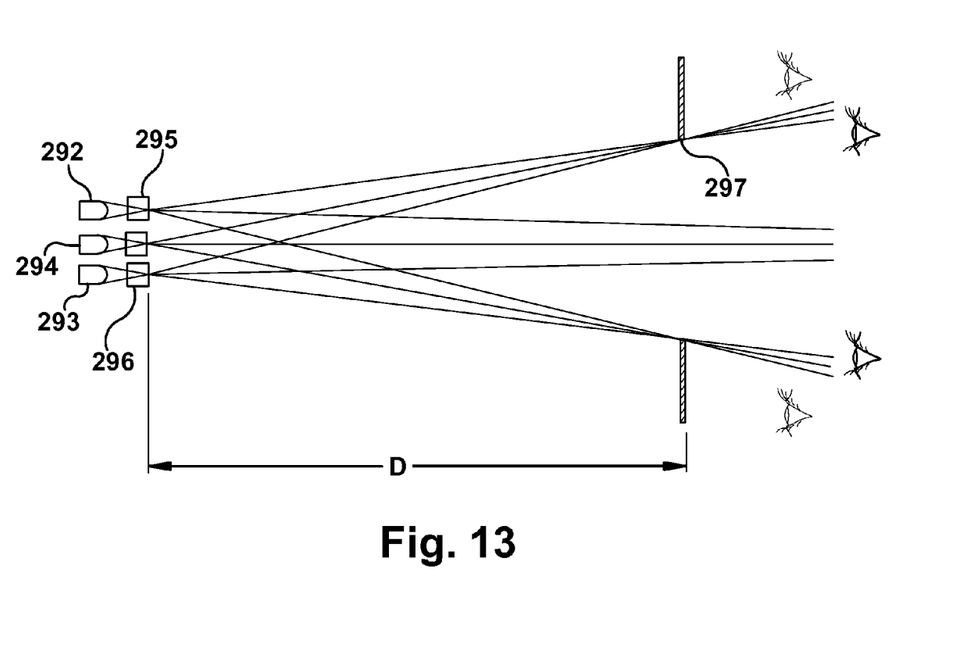

FIG. 13 depicts two sources 292, 293 such as a light emitting diode positioned next to an image capture array 294. This is similar to the depiction of FIG. 10 above. Light from the source passes through a lens 295, 296 bounces off from a mirror represented by an aperture 297. The spacing between the lens and the mirror D is chosen as close to the exit window as possible. This distance between the light source and the mirrors is less than the corresponding distance of FIG. 10. This is possible by use of a higher resolution camera 294 or by allowing the same camera resolution of FIG. 10 but with more field of view divergence. The design of the reader may be such that use of one mirror is desired due to space constraints. The mirror is generally rectangular but angled so that light bounces off the mirror and travels to a region outside the reader housing for illuminating an object.

In the exemplary reader 10 limiting stray light is achieved in two ways. First, the LEDs are placed in very close proximity to the imaging sensor. This way their FOV is matched as close as possible since the internal optical path length is similar. Second, a number of mirrors fold the internal optical path (to keep the FOV from diverging too fast). These fold mirrors are placed in such a fashion so that the illumination FOV is clipped (to match the imaging FOV) so that a minimum amount of stray light exits the scanner.

In the layout of the exemplary bar code reader, it is desirable to get the internal path length as long as possible. Each of the four camera assemblies C1-C4 utilize 3 fold mirrors to maximize path length. The illumination FOV may be clipped using any of the three mirrors in the path, however, it may be desirable to progressively clip the FOV as depicted in FIG. 11. In this case the final mirror in the fold path will act like an aperture, limiting the amount of light emitted from the reader 10. In cases of a single mirror, that mirror is placed as close to the exit window as possible to both increase the path length and define the field of view.

To summarize, the illumination and imaging FOV are limited by the size of fold mirrors contained in the optical path. Stray light is therefore contained within the scanner and not projected out through the windows H,V where it maybe end up in undesirable places.

FIGS. 2-4 further illustrate a typical embodiment. Two camera assemblies C1, C2 are shown mounted to the printed circuit board 22 within the reader housing. Light from the assembly C1 is emitted from an associated light emitting diode D1 along a light path centered along the ray line P10. A high percentage of the light from the LED D1 strikes a mirror M1 causing light to deflect and pass through the housing along a path centered by the ray line P12. Each of the mirrors M1-M12 has a generally planar reflecting surface oriented with respect to light striking that surface to produce a desired degree and direction of reflected light. One observation regarding the first deflection is that the mirror M1 is located away from the horizontal window H so that light not deflected by the mirror M1 is unlikely to distract or annoy the individual scanning the object through the camera field of view.

The light traveling through the housing along the path centered by the light ray P12 strikes the mirror M5 (FIG. 2) and is again reflected to follow the path centered by the light ray P14. The light encounters a third mirror M3 and is reflected out of the housing along the path centered by the light ray P16 which defines the center of the field of view for the camera assembly C1. Returning to FIG. 1, one sees that the bar code 30 is likely to be imaged by this camera assembly due to the fact that the light ray P16 is exiting the horizontal window H in a direction that will strike the bar code 30, be reflected off the object and return along a return path defined by the light rays P10, P12, P14, P16 for imaging by the camera assembly C1.

In reviewing the drawings, one can see that light rays in those drawings are associated with particular camera assemblies and therefore define fields of view outside the housing centered along exit light rays. The camera assembly C2 (FIG. 2) has mirrors M6, M2, and M4 that reflect light centered along rays to define a different field of view. The camera assemblies C3, C4 and the mirrors M7-M12 are shown in FIGS. 3 and 4. These camera assemblies have associated light emitting diodes D3, D4 that emit light which exits the vertical window V. The light rays P30, P32, P34, P36 defined by the mirrors M7, M8, M9 are illustrated in FIG. 3. The light rays P40, P42, P44, P46 defined by the mirrors M10, M11, M129 are illustrated in FIG. 4.

The LEDs for the four cameras operate under control of a controller having a stored program within the image processing system 14. The sequence and timing of the light emitting diodes is controlled by this processor or controller. As noted above the mirrors have generally planar reflecting surfaces but light deflection could also employ slightly concave or convex surfaces.

The camera assemblies C1-C5 use WVGA (Wide VGA) global shutter sensors with high full frame rates (~60 frames per second) that are commercially available. When used with very short, high intensity pulses of light to image the bar code, high swipe speeds of objects are achieved. A combination of a global shutter, high frame rate sensor and the short duration light pulse provide readers that are as fast as laser based systems. They also allow a presentation mode and the ability to selectively perform image capture.

WVGA sensors have pixel counts on the order of 750×480 pixels and can provide the minimum resolution needed in order to decode most bar codes. However, this resolution may be inadequate when decoding higher density bar codes (than standard UPC codes, for instance). In this case megapixel sensors may be more desirable since they can provide higher resolution due to higher pixel count (~3½ times more pixels). However, with the higher pixel count, more information must be buffered in memory and passed on to the CPU. There is also the need for more light from the LEDs. For this reason, it is desirable to window the sensor. A sensor is windowed when a subset of the pixels in the sensor are sent to the image data stream for processing, thus reducing the amount of image data.

The sensor window size may be determined by one of the mirrors acting as an aperture to vignette or window the sensor. One or more of the mirrors in the system is sized to clip the LED FOV and vignette the imaging FOV to a desired size. The mirror size is selected for the resultant FOV to fit through the horizontal or vertical exit window and to provide the (minimum) resolution required. During the manufacturing of the bar code reader a calibration phase determines the sensor windowing size and its location projected back onto the sensor. For example, a sheet of white material is placed in the imaging FOV then the imager and illumination are activated. The pixels that see the white sheet of material are the windowed pixels. This sensor window size is then programmed into the decode microprocessor. Only the windowed pixels that have been vignetted by the mirror will be sent for decode.

The reason for windowing is not only to get the right amount of pixels to the decoder (thus lowering memory size and access time and CPU time) but also to increase the frame rate of the sensor. Most megapixel sensors available today operate at ~30 frames per second when the entire frame is read and then sent out for decode. When windowing, the sensor typically operates at a frame rate that is proportionally higher to the lower window size. So a sensor running with half the frame of the full size may run at a frame rate of twice the full frame.

While the present invention has been described with a degree of particularity, it is the intent that the invention includes all modifications and alterations from the disclosed design falling within the spirit or scope of the appended claims.

What is claimed:

1. A bar code reader for decoding a target bar code on a target object, the bar code reader comprising:
   a housing supporting one or more transparent windows and defining an interior region, a target object being presented in relation to the housing for imaging a target bar code;
   an imaging system comprising
     a camera having an image capture sensor array positioned within the housing interior region for capturing an image of a bar code within a camera field of view;

a light source for the camera positioned in close proximity to the image capture sensor of said camera; and one or more light reflecting fold mirrors positioned with respect to said light source and the sensor array for baffling light from the light source to a light source field of view and transmitting light that bounces from a target in the light source field of view back to the image capture sensor array;

an image processing system comprising a processor having a stored program for identifying a bar code from images captured by the imaging system;

wherein the imaging system has multiple cameras and light sources wherein each camera includes at least one light source positioned in close proximity to an associated image capture sensor;

wherein the camera field of view essentially matches the light source field of view; and wherein a distance between the light source and a last of said fold mirrors positioned closest to the transparent window from which light from the light source exits the housing is at least one half the distance from the light source to said transparent window along a light path of travel.

2. The bar code reader of claim 1 wherein each of the multiple cameras has an image capture sensor array and light source mounted to a common substrate.

3. The bar code reader of claim 1 wherein the light source comprises a light emitting diode that is turned on and off at controlled intervals by the processor.

4. The bar code reader of claim 1 wherein the sensor array gathers light from two or more light reflecting fold mirrors that sequentially transmit light from an object back to the camera.

5. The bar code reader of claim 1 wherein the light reflecting fold mirrors have generally planar light reflecting surfaces.

6. The bar code reader of claim 1 wherein the image capture sensor array has a length and width and wherein the one or more mirrors limit the light source field of view to less than a complete area of the sensor array.

7. The bar code reader of claim 6 wherein the processor evaluates less than an entire area of the image capture array to determine a presence of a bar code.

8. The bar code reader of claim 1 wherein an in focus depth of field distance is centered about a zone immediately adjacent the housing window from which it exits the housing and extends a distance away from the housing less than a distance of light travel from the source to said housing.

9. A method for imaging a target bar code comprising:
providing a housing having one or more transparent windows that define a region for movement and for positioning of an object having a bar code;

positioning a camera having a sensor array within the housing for imaging bar codes on objects outside the housing;

illuminating a region outside the housing by activating a light source in said housing positioned in close proximity to the sensor array of said camera and deflecting light from the light source off from one or more fold mirrors positioned between the source and the one or more transparent windows to baffle light emitted from the source from reaching an illumination field of view;

imaging a target object having a target bar code in a position essentially only within the illumination field of view;

interpreting images from the camera to determine a bar code;

wherein there are multiple cameras and each camera has associated with it multiple mirrors defining a corresponding fields of view; and wherein the light source is a light emitting diode and shielding is provided along a portion of the light path between the light emitting diode and a first of said one or more fold mirrors.

10. The method of claim 9 wherein the imaging is accomplished by the sensor array gathering light following a return path from the illumination field of view by bouncing off from the fold mirrors to the reach the sensor array.

11. The method of claim 9 wherein images are interpreted by an image processor and the image processor is calibrated by:
positioning a calibration object within the illumination field of view;

determining a subset of pixels of the sensor array that image the calibration object; and subsequently decoding signals originating from the subset of pixels.

* * * * *